(12) United States Patent
Kang et al.

(10) Patent No.: US 9,048,466 B2
(45) Date of Patent: Jun. 2, 2015

(54) FLAT FUEL CELL ASSEMBLY WITH AIR CHANNEL DEFINED BY CASE

(75) Inventors: Ku-Yen Kang, Hsinchu (TW);
Chun-Ho Tai, Hsinchu (TW);
Chiou-Chu Lai, Hsinchu County (TW);
Ching-Jung Liu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 1151 days.

(21) Appl. No.: 12/624,429

(22) Filed: Nov. 24, 2009

(65) Prior Publication Data

US 2010/0068584 A1    Mar. 18, 2010

Related U.S. Application Data

(63) Continuation-in-part of application No. 11/842,176, filed on Aug. 21, 2007.

(30) Foreign Application Priority Data

Oct. 20, 2006   (TW) ................................ 95138689 A (51) Int. Cl.
*H01M 8/02*     (2006.01)
*H01M 8/04*     (2006.01)
(Continued)

(52) U.S. Cl.
CPC ............ *H01M 8/04089* (2013.01); *H01M 4/92* (2013.01); *H01M 4/926* (2013.01); *H01M 8/006* (2013.01); *H01M 8/0239* (2013.01); *H01M 8/0245* (2013.01); *H01M 8/04149* (2013.01);
(Continued)

(58) Field of Classification Search
CPC .............. H01M 8/006; H01M 8/0239–8/0245; H01M 8/0269; H01M 8/04089; H01M 8/04149
USPC ......... 429/408, 412, 414, 450, 479, 483, 517, 429/529
See application file for complete search history.

(56) References Cited

U.S. PATENT DOCUMENTS 3,418,169 A * 12/1968 Matsen et al. ................. 429/450
2004/0209133 A1 * 10/2004 Hirsch et al. .................... 429/22
(Continued)

FOREIGN PATENT DOCUMENTS

JP      2005038738 A *  2/2005   .............. H01M 8/02
JP      2005-038738       10/2005
(Continued)

OTHER PUBLICATIONS

Machine translation for Mihara et al., JP 2005-038738 A.*
(Continued)

*Primary Examiner* — Edu E Enin-Okut
(74) *Attorney, Agent, or Firm* — Jianq Chyun IP Office (57) ABSTRACT

A flat fuel cell assembly including a MEA, a cathode porous current collector, an anode porous current collector, a gas barrier material layer, a case, and at least one air baffle is provided. The cathode porous current collector and the anode porous current collector are disposed at two opposite sides of the MEA. The gas barrier material layer is disposed at a side of the cathode porous current collector and has at least one opening for exposing a surface of the cathode porous current collector. The case is disposed at a side of the MEA, the gas barrier material layer is disposed between the case and the MEA, and an air channel is located between the gas barrier material layer and the case. Additionally, the air baffle disposed within the air channel.

19 Claims, 10 Drawing Sheets

(51) Int. Cl.
- *H01M 8/00* (2006.01)
- *H01M 8/24* (2006.01)
- *H01M 4/92* (2006.01)
- *H01M 8/10* (2006.01)

(52) U.S. Cl.
CPC .......... *H01M 8/1011* (2013.01); *H01M 8/1013* (2013.01); *H01M 8/2465* (2013.01); *Y02E 60/50* (2013.01)

(56) References Cited

U.S. PATENT DOCUMENTS

| | | |
|---|---|---|
| 2004/0209153 A1 * | 10/2004 | Peled et al. .................. 429/42 |
| 2004/0209154 A1 | 10/2004 | Ren et al. |
| 2005/0079398 A1 | 4/2005 | Tomioka et al. |
| 2005/0164071 A1 | 7/2005 | Horiguchi |
| 2006/0019135 A1 | 1/2006 | Curello et al. |
| 2006/0035124 A1 | 2/2006 | Takei |
| 2006/0199061 A1 * | 9/2006 | Fiebig et al. .................. 429/32 |
| 2007/0059575 A1 * | 3/2007 | Kan et al. .................... 429/30 |

FOREIGN PATENT DOCUMENTS

| | | | |
|---|---|---|---|
| JP | 2006-269126 | 1/2006 | |
| JP | 2006269126 A * | 10/2006 | .............. H01M 8/02 |
| JP | 2007242372 A * | 9/2007 | .............. H01M 8/02 |
| WO | 2005112172 | 11/2005 | |
| WO | WO 2005112172 A1 * | 11/2005 | .............. H01M 8/10 |
| WO | 2006101071 | 9/2006 | |

OTHER PUBLICATIONS

Machine translation for Monma et al., JP 2006-269126 A.*
"Office Action of Taiwan Counterpart Application", issued on Dec. 15, 2010, p. 1-p. 6.
"1st Office Action of US Co-pending Application", issued on Mar. 6, 2009, p. 1-p. 11.
"Final Office Action of US Co-pending Application", issued on Aug. 21, 2009, p. 1-p. 10.
"Advisory Action of US Co-pending Application", issued on Nov. 25, 2009, p. 1-p. 3.
"E-TEK ELAT Gas Diffusion Layers". Accessed on: Jul. 30, 2012. Web: http://fuelcellstore.com/products/etek/LT1200-W.pdf.
"Office Action of U.S. counterpart application" issued on Aug. 3, 2012, p. 1-p. 16.

* cited by examiner

FLAT FUEL CELL ASSEMBLY WITH AIR CHANNEL DEFINED BY CASE

CROSS-REFERENCE TO RELATED APPLICATION

This application is a continuation-in-part application of and claims the priority benefit of patent application Ser. No. 11/842,176, filed on Aug. 21, 2007, which claims the priority benefit of Taiwan application Serial No. 95138689, filed on Oct. 20, 2006. The entirety of each of the above-mentioned patent applications is hereby incorporated by reference herein and made a part of this specification.

BACKGROUND OF THE INVENTION

1. Field of the Invention

The present invention relates to a fuel cell structure, and more particularly to a flat fuel cell assembly.

2. Description of Related Art

With the rapid development of industry, the consumption of conventional energy source such as coal, petroleum, and natural gas is increasingly high, and due to the limited storage of natural energy source, novel alternative energy source must be researched and developed to substitute the conventional energy source, and the fuel cell is taken as an important and practical choice.

In brief, the fuel cell is substantially a power generator that converts chemical energy into electric energy by utilizing the reverse reaction of the water electrolysis. The proton exchanging membrane fuel cell mainly includes a membrane electrode assembly (MEA) and two electrode plates. The MEA includes a proton conducting membrane, an anode catalyst layer, a cathode catalyst layer, an anode gas diffusion layer (GDL) and a cathode GDL. The anode catalyst layer and the cathode catalyst layer are respectively disposed on two sides of the proton conducting membrane, and the anode GDL and the cathode GDL are respectively disposed on the anode catalyst layer and the cathode catalyst layer. Furthermore, two electrode plates include an anode and a cathode, which are respectively disposed on the anode GDL and the cathode GDL.

Currently, the common proton exchanging membrane fuel cell is Direct Methanol Fuel Cell (DMFC), which directly takes the methanol aqueous solution as the source for supplying fuel, and generates currents through the relevant electrode reaction between methanol and oxygen, wherein the reaction formulas of the DMFC are shown as follows:

anode: $CH_3OH+H_2O \rightarrow CO_2+6H^++6H^++6e^-$; cathode: $3/2O_2+6H^++6e^- \rightarrow 3H_2O$.

During the reaction, 1 mol of water is consumed at anode, three mol of water is generated at the cathode, and the water generated in the reaction must be removed immediately, and cannot be kept at the surface of the catalyst layer, in such a manner, the fuel cell can react continuously, thereby generating currents.

As for the water management in the fuel cell, many solutions have been proposed in this field. For example, early US Patent Publication No. 2005/0079398A1 (U.S. Pub. No. 2005/0079398A1) entitled "FUEL CELL" had disclosed that, additional devices such as pump, heat sink, and fan are used to remove the water generated in the fuel cell. However, this method increases the cost, and enlarges the volume of the whole assembly, which thus cannot be miniaturized. Furthermore, early US Patent Publication No. 2004/0209154A1 (U.S. Pub. No. 2004/0209154A1) entitled "PASSIVE WATER MANAGEMENT TECHNIQUES IN DIRECT METHANOL FUEL CELLS" had disclosed that, a hydrophobic material layer with micro-pores is disposed at the external side of the cathode, such that the water of cathode generates a back pressure there-between; then, the water is permeated to anode by utilizing the pressure difference between two sides of the proton conducting membrane, such that the water is recycled and used within the fuel cell. However, this method causes the problem that the micro pores are blocked by water or the water cannot be recycled. Thus, the above method is complicated in manufacturing, and the method even causes the problem that the air cannot be entered therein smoothly, thereby influencing the output power of the fuel cell.

Another water management in the fuel cell is provided in the Japan Patent Gazette WO 2006/101071, which had disclosed a fuel cell having an air chamber on the cathode side, and a humidity-holding sheet is filled in the air chamber. The humidity-holding sheet is mainly used to prevent the water generated at the cathode side from evaporating, and further increase the water storage in the cathode catalyst layer. Through the osmotic pressure phenomenon, the water generated in the cathode catalyst layer is promoted to move towards the anode catalyst layer.

Furthermore, the Japan Patent Gazette WO 2005/112172A1 had disclosed a fuel cell that vaporize the liquid fuel and then supply it to the catalyst layer, wherein the anode structure of the fuel cell must include a fuel tank, a fuel vaporizing layer and a vaporized fuel collector and the like, so as to vaporize the liquid fuel, and the cathode includes a humidity-holding layer with an appropriate moisture permeability and air permeability. However, the humidity-holding layer is made of a porous material with uniform micro pores, and during practical use, the micro pores are easily to be blocked due to the condensation of moisture, such that the gas cannot enter therein, thereby influencing the output power of the fuel cell.

In view of the above, the water management is a crucial technique for the fuel cell, which has become a key issue being researched and developed in this field.

SUMMARY OF THE INVENTION

In view of the above, the present invention is directed to providing a flat fuel cell assembly with good performance.

As embodied and broadly described herein, the present invention provides a flat fuel cell assembly including a MEA, a cathode porous current collector, an anode porous current collector, a gas barrier material layer, a case, and at least one air baffle. The cathode porous current collector and the anode porous current collector are disposed at two opposite sides of the MEA. The gas barrier material layer is disposed at a side of the cathode porous current collector and has at least one opening for exposing a surface of the cathode porous current collector. The case is disposed at a side of the MEA, the gas barrier material layer is disposed between the case and the MEA, and an air channel is located between the gas barrier material layer and the case. Additionally, the air baffle disposed within the air channel.

According to an embodiment of the present invention, the MEA comprises a proton conducting membrane, an anode catalyst layer, a cathode catalyst layer, an anode GDL and a cathode GDL, wherein the anode catalyst layer and the cathode catalyst layer are respectively disposed on two sides of the proton conducting membrane, and the anode GDL and the cathode GDL are respectively disposed on the anode catalyst layer and the cathode catalyst layer.

According to an embodiment of the present invention, the diameter of the opening is DI, the thickness of the gas barrier material layer is T, and D>2T.

According to an embodiment of the present invention, the flat fuel cell assembly further comprises a water absorbent material layer disposed on the case, wherein the water absorbent material layer is between the case and the gas barrier material layer.

According to an embodiment of the present invention, the flat fuel cell assembly further comprises an air fan for generating an air flow, wherein the air flows from an air inlet of the air channel to an air outlet of the air channel.

According to an embodiment of the present invention, the case is a gas-impermeable case.

According to an embodiment of the present invention, the air baffle is disposed on the gas barrier material layer and extends toward the case.

According to an embodiment of the present invention, the air baffle is disposed on the case and extends toward the gas barrier material layer.

According to an embodiment of the present invention, the opening ratio of the gas barrier material layer falls within 0.5%-21%.

According to an embodiment of the present invention, the material of the gas barrier material layer comprises a polyester polymer or a polyolefin polymer, wherein the polyester polymer is, for example, polyethylene terephthalate (PET) or polyacrylonitrile (PAN), and the polyolefin polymer is, for example, polyethylene (PE), polypropylene (PP), or another gas barrier material suitable for opening processing.

According to an embodiment of the present invention, the thickness of the gas barrier material layer falls within 10 μm-5 mm.

According to an embodiment of the present invention, a gap is between the gas barrier material layer and the cathode porous current collector, and the gap is smaller than 1.5 cm.

According to an embodiment of the present invention, the gas barrier material layer is in contact with the cathode porous current collector.

According to an embodiment of the present invention, the flat fuel cell assembly further includes a hydrophobic porous material layer disposed between the cathode porous current collector and the gas barrier material layer. The material of the hydrophobic porous material layer is, for example, polytetrafluoroethylene (PTFE), polypropylene (PP), or polyethersulfone (PES), or relevant material with hydrophobic measures coated on its surface and the opening. In one embodiment, the hydrophobic porous material entirely covers the cathode porous current collector. In another embodiment, the hydrophobic porous material is located on the cathode porous current collector and is exposed by the opening of the gas barrier material layer.

According to an embodiment of the present invention, the material of the proton conducting membrane is, for example, polymeric membrane.

According to an embodiment of the present invention, the material of the anode catalyst layer is, for example, Pt/Ru alloy, carbon material particles plated with Pt/Ru alloy or carbon material particles plated with Pt.

According to an embodiment of the present invention, the material of the cathode catalyst layer is, for example, Pt alloy, carbon material particles plated with Pt alloy or carbon material particles plated with Pt.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
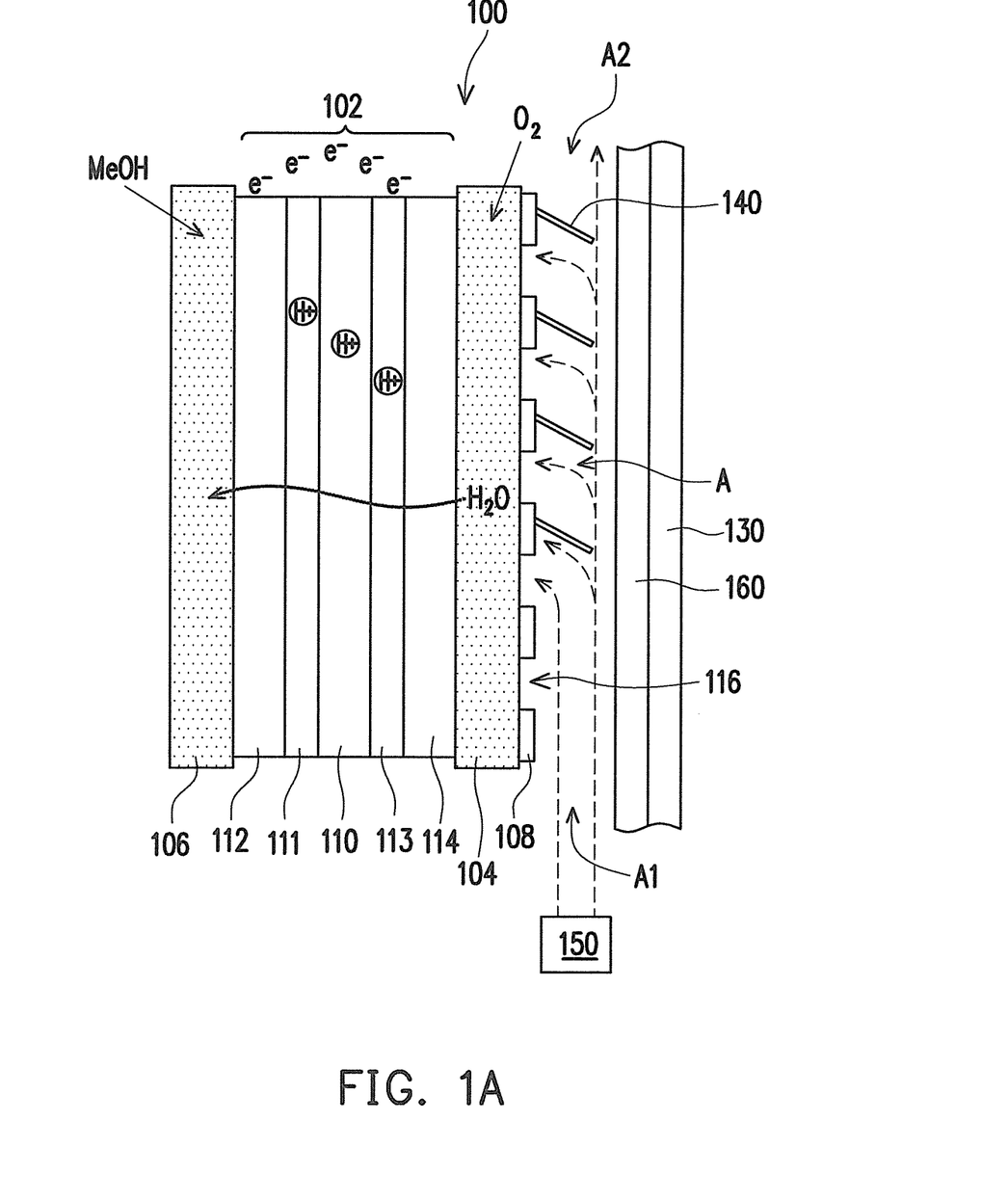
FIG. 1A is a schematic structural view of a flat fuel cell assembly according to an embodiment of the present invention.

FIG. 1A is a schematic structural view of a flat fuel cell assembly according to an embodiment of the present invention. Referring to FIG. 1A, the flat fuel cell assembly 100 includes a membrane electrode assembly (MEA) 102, a cathode porous current collector 104, an anode porous current collector 106, a gas barrier material layer 108, a case 130, and at least one air baffle 140. As shown in FIG. 1A, the case 130 is disposed at a side of the MEA 102, the gas barrier material layer 108 is disposed between the case 130 and the MEA 102, and an air channel A is located between the gas barrier material layer 108 and the case 130. Additionally, the air baffle 140 is disposed within the air channel A. For instance, the distance between the case 130 and the gas barrier material layer 108 may be falls within about 0.3 mm to about 3 mm.

In the present embodiment, the MEA 102 includes a proton conducting membrane 110, an anode catalyst layer 111, a cathode catalyst layer 113, an anode gas diffusion layer (GDL) 112 and a cathode GDL 114, wherein the anode catalyst layer 111 and the cathode catalyst layer 113 are respectively disposed on both sides of the proton conducting membrane 110, and the anode GDL 112 and the cathode GDL 114 are respectively disposed on the anode catalyst layer 111 and the cathode catalyst layer 113. The material of the anode catalyst layer 111 is, for example, Pt/Ru alloy, carbon material particles plated with Pt/Ru alloy, carbon material particles plated with Pt or other suitable materials. The material of the cathode catalyst layer 113 is, for example, Pt alloy, carbon material particles plated with Pt alloy, carbon material particles plated with Pt or other suitable materials. The proton conducting membrane 110 is served as the electrolyte membrane for transmitting protons, and the material thereof is, for example, polymeric membrane, which is, for example, Nafion membrane (brand name) fabricated by the DuPont Company, USA.

The anode porous current collector 106 is disposed on one side of the anode GDL 112 of the MEA 102. The material of the anode porous current collector 106 is, for example, conducting materials, such as Ti and the alloy thereof. The cathode porous current collector 104 is disposed on one side of the cathode GDL 114 of the MEA 102. In an embodiment of the present invention, the material of the cathode porous current collector 104 is, for example, conducting materials, such as Ti and the alloy thereof.

The flat fuel cell assembly 100 in this embodiment further includes a gas barrier material layer 108, which is disposed on the cathode porous current collector 104, and in contact with the cathode porous current collector 104. The material of the gas barrier material layer 108 includes, for example, polyester polymer or a polyolefin polymer, wherein the polyester polymer is, for example, polyethylene terephthalate (PET) or polyacrylonitrile (PAN), and the polyolefin polymer is, for example, polyethylene (PE), polypropylene (PP), or another gas barrier material. The thickness of the gas barrier material layer falls within, for example, 10 μm-5 mm. In an embodiment of the present invention, the thickness of the gas barrier material layer 108 is, for example, about 100 μm. The gas barrier material layer 108 is used to control the evaporation speed of the water generated by the cathode catalyst layer 113 after the reaction, such that the water of the cathode catalyst layer 113 is diffused to the anode catalyst layer 111 via the proton conducting membrane 110, therefore, the water of the cathode catalyst layer 113 can be supplied to the anode catalyst layer 111 for being used in the reaction.

The gas barrier material layer 108 has at least one opening 116 for exposing the surface of the cathode porous current collector 104, and in this embodiment, a plurality of openings 116 are depicted for being taken as an example. Moreover, in the embodiments of the present invention, the shape of the openings 116 is not particularly limited. Since the flat fuel cell assembly of the present invention generates water in the cathode catalyst layer 113 during the reaction, the size of the openings 116 for the gas barrier material layer 108 must be designed in consideration of avoiding to be drowned by water. From experience, in order to prevent the openings 116 from being blocked by water, the minimum aperture of the opening 116 must be larger than twice of the thickness of the gas barrier material layer 108. That is, if the opening 116 is a round opening, the diameter should be larger than twice of the thickness of the gas barrier material layer 108. In this embodiment, the diameter of the opening 116 is about over 200 μm. If the opening 116 is a rectangular opening, the length of the short side must be larger than twice of the thickness of the gas barrier material layer 108, and in this embodiment, the length of the short side of the opening 116 is about over 200 μm.

The overall opening ratio of the gas barrier material layer 108 falls within 0.5%-21%, and in an embodiment of the present invention, the opening ratio of the gas barrier material layer 108 is, for example, about 5%. The adaptability of the opening ratio for the gas barrier material layer of the present invention is illustrated blow through being calculated by the following equations. Generally speaking, when the fuel electrode assembly generates a current of 1 A, the cathode catalyst layer requires 3.5 ml/min of $O_2$ to participate in the reaction, that is, about 17.4 ml/min of air. In practical application, at least 1.1-4 times of that amount of air is required to ensure that sufficient $O_2$ has entered into the cathode catalyst layer. The air permeability of the gas barrier material layer is estimated through the following diffusion equation (1):

$$i = -nFD\frac{\Delta C}{\Delta y}, \tag{1}$$

wherein, i indicates the current generated in each unit of area, with the unit as $A/cm^2$; n indicates the mole ratio, and in the reaction of the cathode catalyst layer, there is 1 mole of $O_2$ to 4 mole of electrons, and thus n is 4; F indicates the coul for each mole of electrons, with the value of about 96500 coul/mole; D indicates the diffusion coefficient, with the unit of $cm^2/s$, and generally, the diffusion coefficient of $O_2$ in the air is about 0.2-0.3 $cm^2/s$; $\Delta C$ indicates the concentration difference, with the unit as $mole/cm^3$, and in the normal temperature environment of 1 atmospheric pressure, there are about $8.6 \times 10^{-6}$ mole of $O_2$ for 1 cubic centimeter; and $\Delta y$ indicates the length of the diffusion path, with the unit as centimeter. Taking the thickness of the gas barrier material layer being $1 \times 10^{-2}$ cm and the opening ratio of the gas barrier material layer being 1% for example, the current value i calculated through Equation (1) is 660 $mA/cm^2$, and the value must be divided by 1.1-4, which is sufficient for supplying the electric power for most of the circumstances.

The case 103 is a gas-impermeable case, for example. It is noted that, the case 130 may be an outer housing of an electronic device or an inner housing assembled within the outer housing. In additional, an air inlet A1 and an air outlet A2 of the air channel A are defined by the case 130. As shown in FIG. 1A, in addition to the air inlet A1 and the air outlet A, no hole designed for purpose of water evaporation is required to be formed on the case 130 of the present embodiment. In the present embodiment, the flat fuel cell assembly 100 further includes an air fan 150 for generating an air flow shown by dotted line, wherein the air flows from an air inlet A1 of the air channel A to an air outlet A2 of the air channel A. Accordingly, even though the case 130 is blocked by object, oxygen ($O_2$) is sufficiently provided in the air channel A by the air fan 150, and accordingly the operation of the flat fuel cell assembly 100 is not affected. For instance, when the case 130 is an outer housing of an electronic device and the outer housing of the electronic device is placed on a table, the water evaporation of the flat fuel cell assembly 100 is not affected at all because the water evaporation of the flat fuel cell assembly 100 relies on the air flow generated from the air fan 150. It is noted that the air flow generated from the air fan 150 may be used to activate the cathode catalyst layer 113, so-called air starvation.

In the present embodiment, the flat fuel cell assembly 100 further includes a water absorbent material layer 160 disposed on an inner surface of the case 130. In other words, the water absorbent material layer 160 is between the case 130 and the gas barrier material layer 108. The water absorbent material layer 160 is helpful to prevent water accumulation. For instance, the water absorbent material layer 160 is a hydrophilic material layer having a thickness of about 100 micrometers. The water absorbent material layer 160 may entirely cover the inner surface of the case 130 or partially cover the inner surface of the case 130. The water absorbent material layer 160 may includes a plurality of stripe patterns (not shown).

As shown in FIG. 1A, a plurality of air baffles 140 are illustrated and the air baffles 140 are disposed on the gas barrier material layer 108 and extends toward the case 130. The distribution and quantity of the air baffles 140 disposed on the gas barrier material layer 108 is determined in accordance with design requirements. In a preferred embodiment, the air baffles 140 may be disposed near the air outlet A2 to as to conduct the air flowing into the cathode porous current collector 104 more efficiently.

Figure 1B:
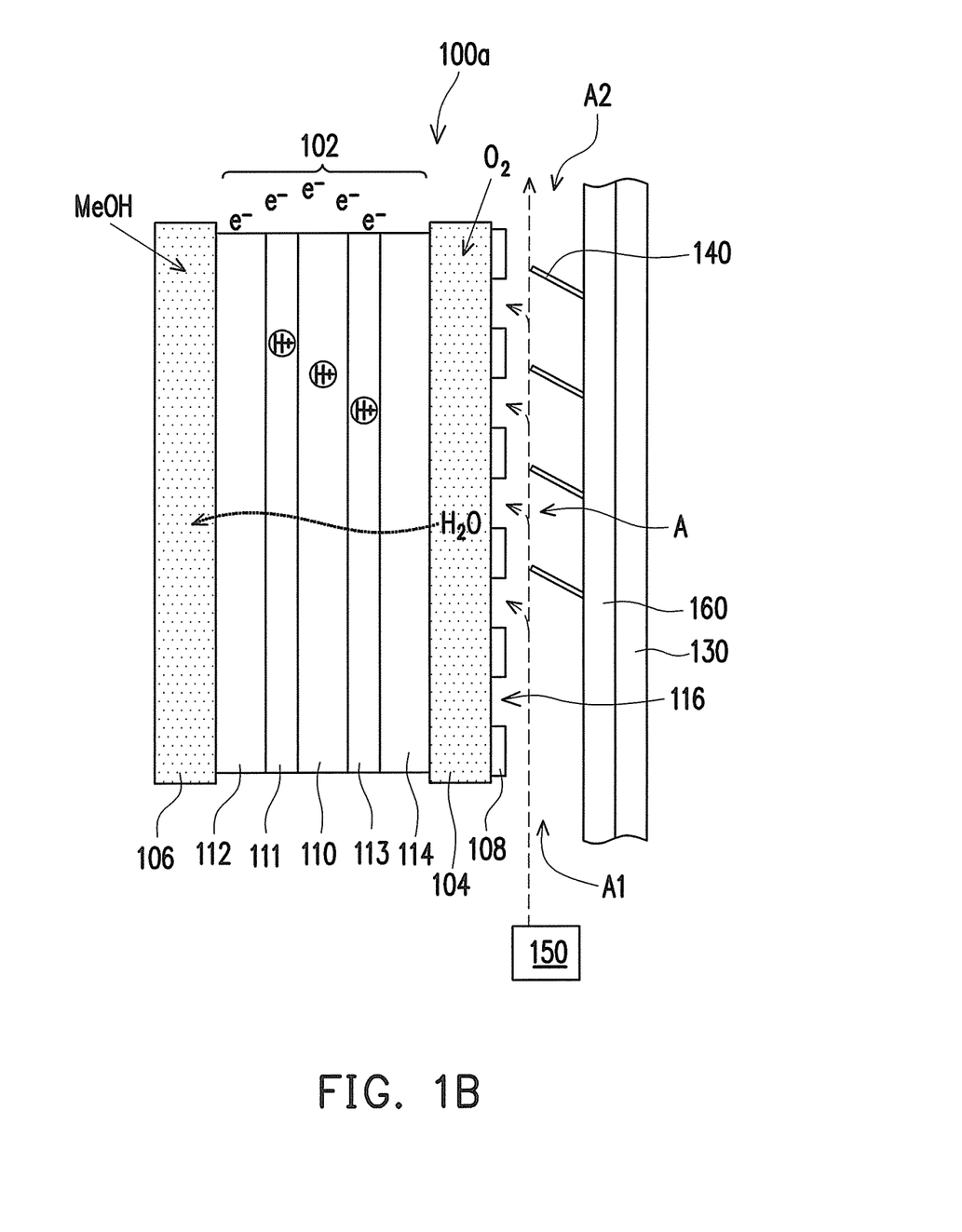
FIG. 1B is a schematic structural view of a flat fuel cell assembly according to an alternate embodiment of the present invention.

FIG. 1B is a schematic structural view of a flat fuel cell assembly according to an alternate embodiment of the present invention. Referring to FIG. 1B, the flat fuel cell assembly 100a of this embodiment is similar to flat fuel cell assembly 100 of the above embodiment except that: the air baffles 140 are disposed on the case 130 and extends toward the gas barrier material layer 108. It can be known from FIG. 1A and FIG. 1B, in an alternate embodiment, parts of the air baffles 140 are disposed on the case 130 and extends toward the gas barrier material layer 108, while other parts of the air baffles 140 are disposed on the gas barrier material layer 108 and extends toward the case 130.

Figure 2:
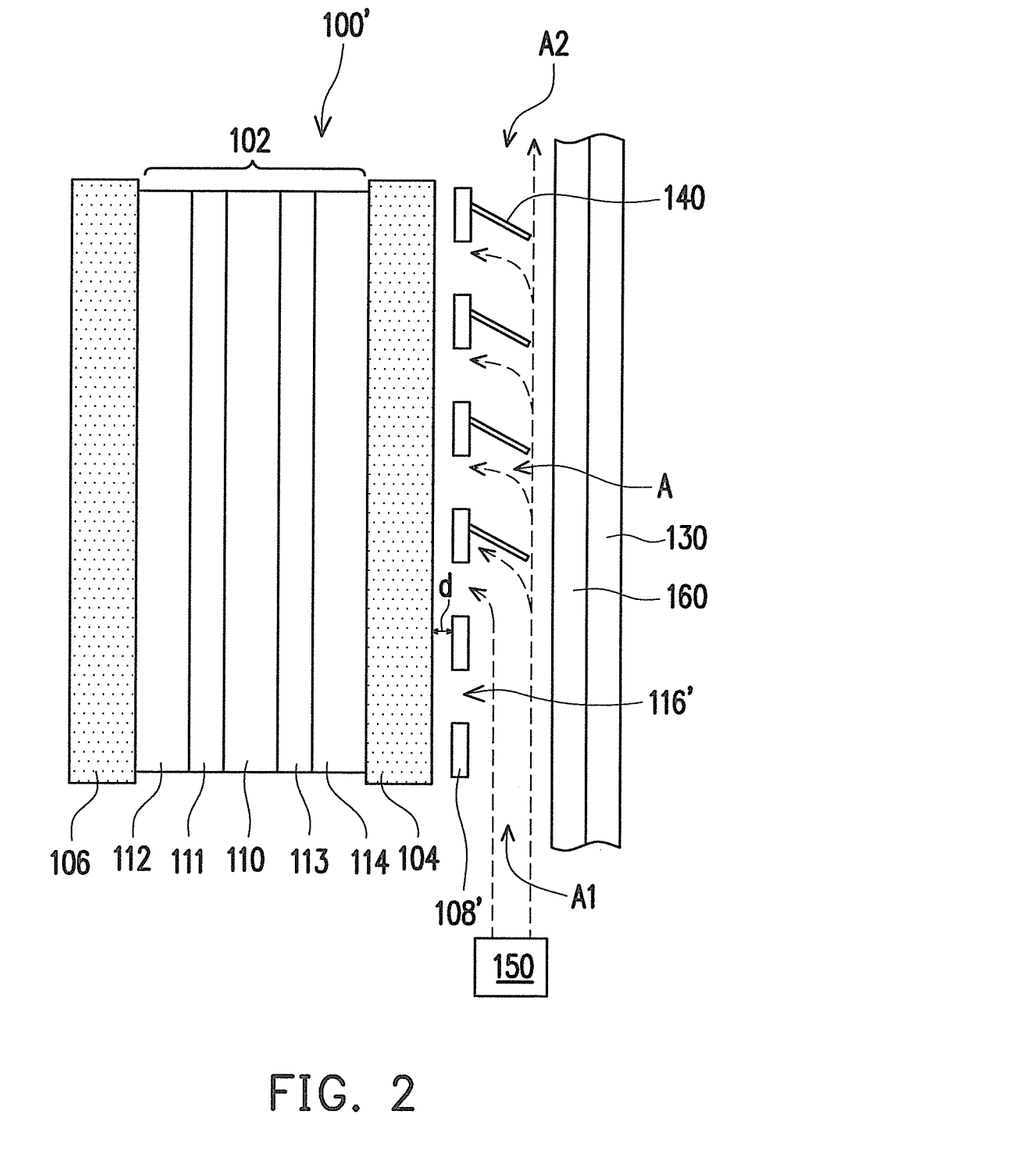
FIG. 2 is a schematic structural view of a flat fuel cell assembly according to another embodiment of the present invention.

Furthermore, referring to FIG. 2, a schematic structural view of a flat fuel cell assembly according to another embodiment of the present invention is shown. As shown in FIG. 2, the flat fuel cell assembly 100' of this embodiment is similar to flat fuel cell assembly 100 of the above embodiment except that the gas barrier material layer 108' of the flat fuel cell assembly 100' is disposed on the cathode porous current collector 104, and it has a plurality of openings 116' for exposing the surface of the cathode porous current collector 104. Moreover, a gap (d) is located between the gas barrier material layer 108' and the cathode porous current collector 104, and the gap (d) is smaller than 1.5 cm.

The flat fuel cell assembly of the present invention only needs to dispose a gas barrier material layer with openings on the cathode porous current collector, and the opening ratio of the gas barrier material layer falls within a certain range, such that the cathode catalyst layer is capable of reducing the evaporation of the water, which causes a concentration gradient difference from the cathode catalyst layer to the anode catalyst layer, thereby causing the water of the cathode catalyst layer to diffuse towards the anode catalyst layer, and thus the water of the cathode catalyst layer is recycled at the anode catalyst layer for being reused. Therefore, the manufacturing method is relatively simple, and the elements required for the whole fuel cell is fewer, which thus saving the manufacturing cost. On the other aspect, the present invention may recycle the water in the cathode catalyst layer in a simple and effective way without changing the inner structure of the MEA in the existing fuel cell.

It should be noted that, since the flat fuel cell assembly of the present invention enables the water of the cathode catalyst layer to be recycled to the anode catalyst layer for being reused, a fuel with a high concentration can be used for the reaction, thereby enhancing the energy conversion efficiency of the fuel.

Then, the method for recycling the water in the cathode catalyst layer of the flat fuel cell assembly is illustrated below in great detail by taking the flat fuel cell assembly 100 in FIG. 1A as an example.

Referring to FIG. 1A again, the fuel is fed into the anode porous current collector 106, and in this embodiment, the methanol (MeOH) aqueous solution is taken as the fuel. Certainly, the fuel of the flat fuel cell assembly in the present invention further includes ethanol, propanol or another suitable fuel. Then, the air is entered therein via the opening 116 of the gas barrier material layer 108, and it is transmitted to the cathode catalyst layer 113 after passing through the cathode porous current collector 104 and the cathode GDL 114. Then, under the effect of the anode catalyst layer 111, the methanol aqueous solution is reacted to generate protons (H+), electrons (e−) and carbon dioxide ($CO_2$). The generated protons reach the cathode catalyst layer 113 via the proton conducting membrane 110, and the electrons reach the cathode catalyst layer 113 via the external circuit, which are reacted with O provided by the air to form into water ($H_2O$) under the effect of the cathode catalyst layer 113. After water is generated from the reaction in the cathode catalyst layer 113, the gas barrier material layer 108 controls the evaporation speed of the water accumulated in the cathode catalyst layer 113, which causes a concentration difference of water at the left and right sides of the proton conducting membrane 110, such that the water in the cathode catalyst layer 113 diffuses towards the anode catalyst layer 111, thereby achieving the object of recycling the water.

Figure 3:
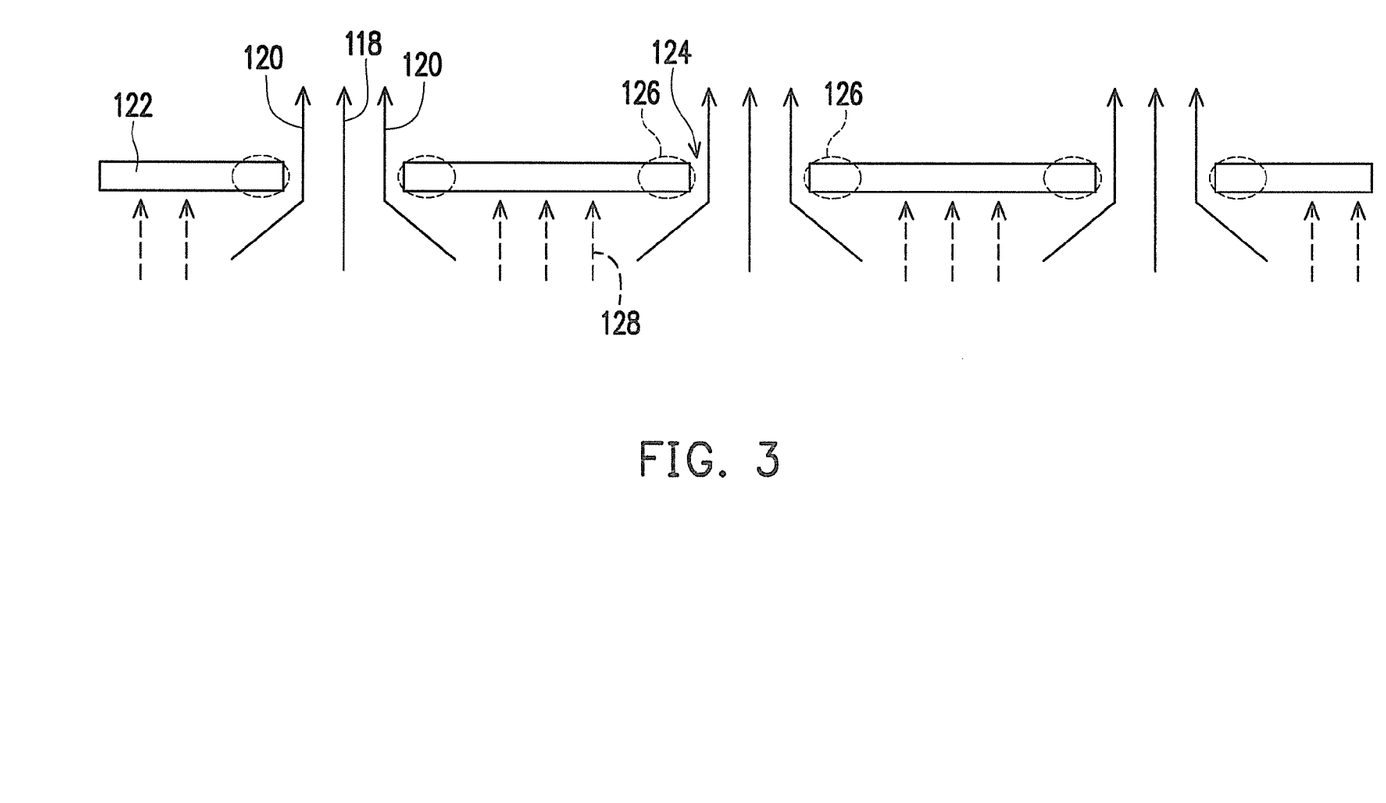
FIG. 3 shows an evaporation mechanism of water generated at the cathode catalyst layer of the flat fuel cell assembly according to the present invention.

Specifically, referring to FIG. 3, an evaporation mechanism of water generated at the cathode catalyst layer of the flat fuel cell assembly according to the present invention is shown. Merely the gas barrier material layer is depicted in FIG. 3, but other means of the flat fuel cell assembly are omitted. As shown in FIG. 3, water vapors generated at different positions have different evaporation paths. A portion of the water vapor generated from the reaction of the cathode catalyst layer passes through an opening 124 of a gas barrier material layer 122 along evaporation paths 118, 120, and then vanished to the atmosphere. Furthermore, as shown by the evaporation path 128, the other water vapors are blocked by the gas barrier material layer 122. As known from the above that, the gas barrier material layer in the flat fuel cell assembly of the present invention not only can reduce the overall evaporation rate of the water vapor, but also enhance the humidity, and thus achieving the object of recycling the water.

Referring to FIG. 3 again, as known from the evaporation paths 118, 120, and 128, the surrounding area 126 of the opening 124 of the gas barrier material layer 122 is a relatively dry area, that is, the surrounding area 126 of the opening 124 has a lower humidity compared with the gas barrier material layer 122 in the other areas. Therefore, in order to achieve a preferred effect of recycling the water, the flat fuel cell assembly of the present invention is further provided with a hydrophobic porous material layer, which is further described below through a plurality of embodiments.

Figure 4:
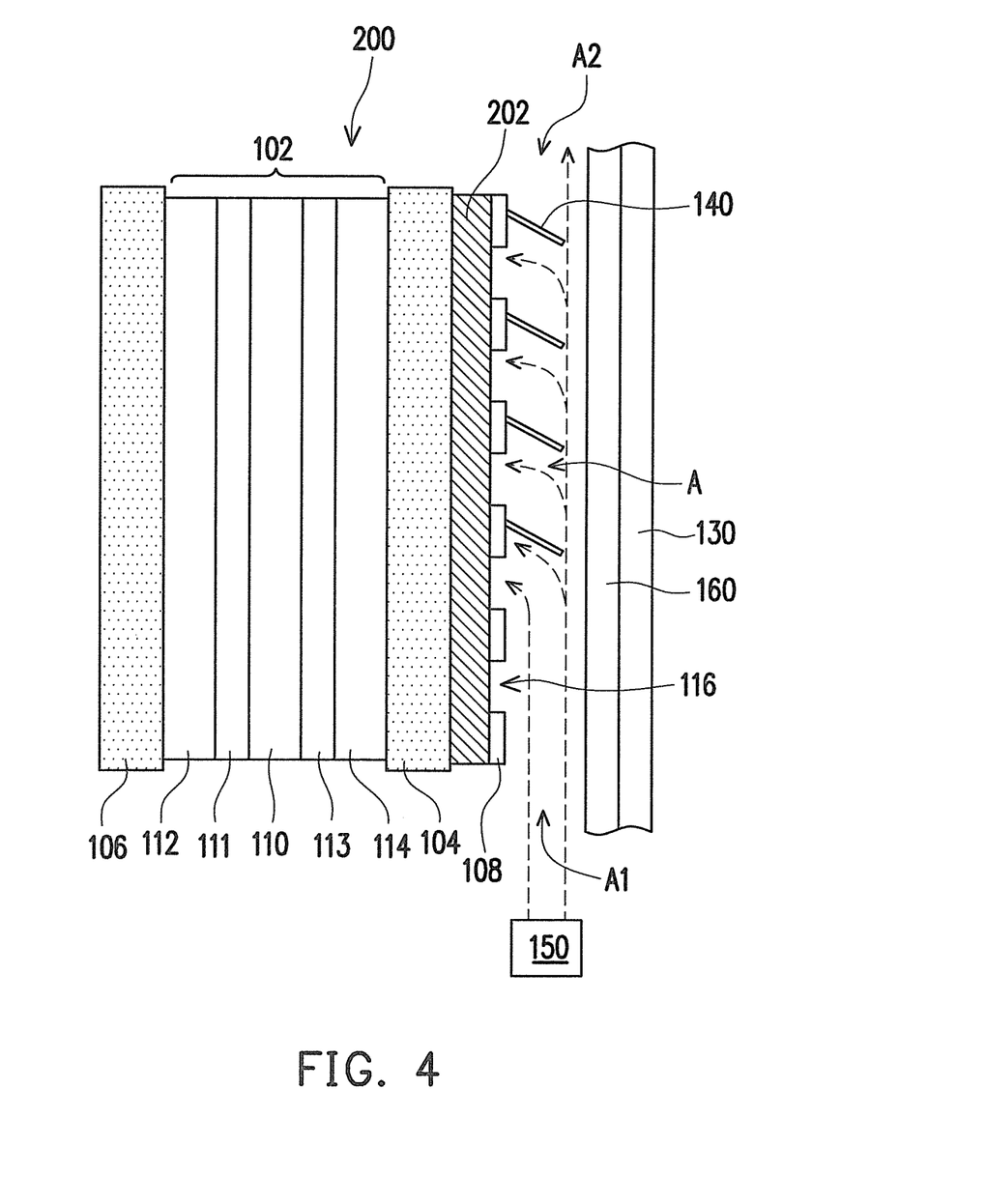
FIG. 4 is a schematic structural view of a flat fuel cell assembly according to still another embodiment of the present invention.

Referring to FIG. 4, it is a schematic structural view of a flat fuel cell assembly according to still another embodiment of the present invention. As shown in FIG. 4, the flat fuel cell assembly 200 of this embodiment is similar to the flat fuel cell assembly 100 of FIG. 1A, but the main difference therebetween lies in that the flat fuel cell assembly 200 further includes a hydrophobic porous material layer 202. The hydrophobic porous material layer 202 is disposed between the cathode porous current collector 104 and the gas barrier material layer 108, and entirely covers the cathode porous current collector 104. The hydrophobic porous material layer 202 is mainly made of, for example, PTFE, PP, PES, or relevant material with hydrophobic measures coated on its surface and the opening. A thickness of the hydrophobic porous material layer 202 is between about 100 μm to 2 mm, for example. The hydrophobic porous material layer 202 has a function of maintaining the water vapors, such that the evaporation speed at the area right below the opening 116 of the gas barrier material layer 108 and the surrounding area is reduced. In other words, no relatively dry areas exist surrounding the opening 116 of the gas barrier material layer 108, and the gas barrier material layer 108 can have an extremely high and uniform humidity, and thus, the effect of recycling the water is preferably enhanced and becomes stable.

Figure 5:
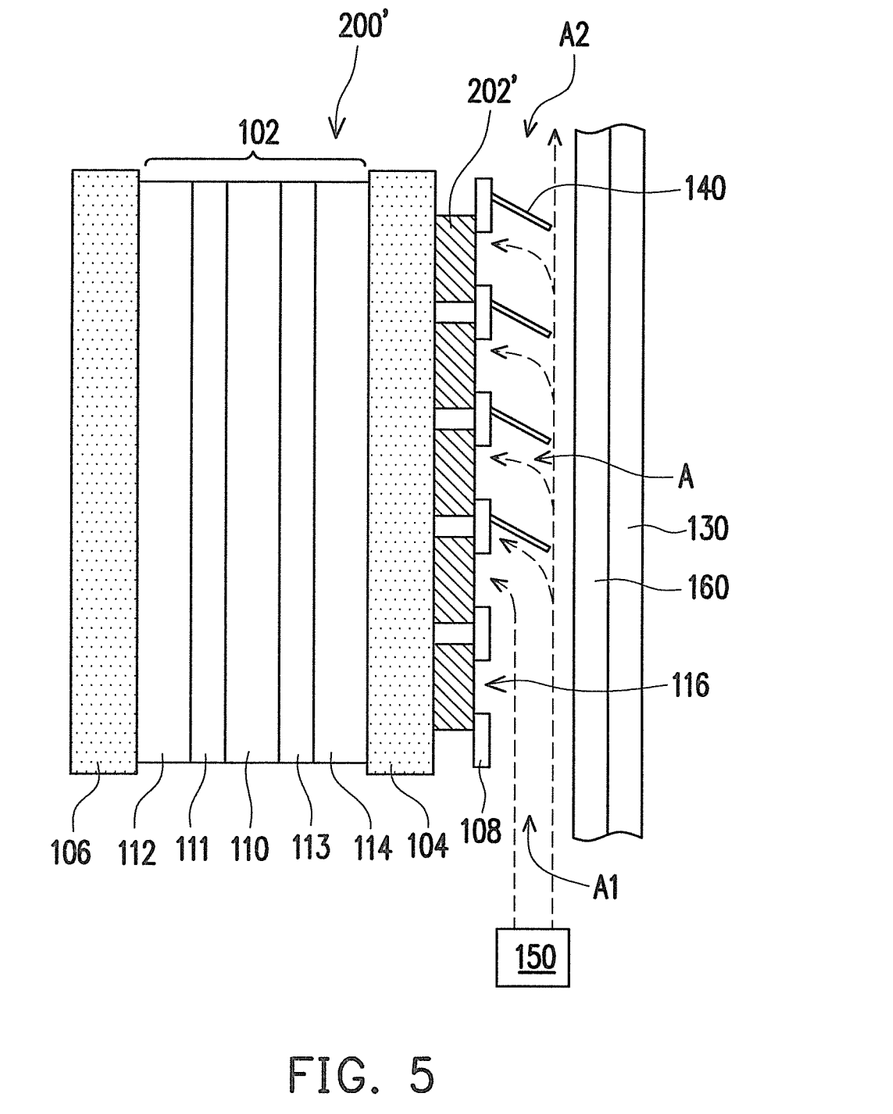
FIG. 5 is a schematic structural view of a flat fuel cell assembly according to yet another embodiment of the present invention.

Referring to FIG. 5, it is a schematic structural view of a flat fuel cell assembly according to yet another embodiment of the present invention. As shown in FIG. 5, the flat fuel cell assembly 200' of this embodiment is similar to the flat fuel cell assembly 100 of FIG. 1A, but the main difference therebetween lies in that the flat fuel cell assembly 200' further includes a hydrophobic porous material layer 202'. The hydrophobic porous material layer 202' is disposed between the cathode porous current collector 104 and the gas barrier material layer 108, and located on the cathode porous current collector 104 and is exposed by the opening 116 of the gas barrier material layer 108. The hydrophobic porous material layer 202' is made of, for example, PTFE, PP, PES, or relevant material with hydrophobic measures coated on the surface and opening. a thickness of the hydrophobic porous material layer 202' is between about 100 μm to 2 mm. The hydrophobic porous material layer 202' not only can reduce the evaporation rate at the area right below the opening 116 of the gas barrier material layer 108 and that at the surrounding area to enhance the effect of recycling the water, but also further force the water vapors below the gas barrier material layer 108 to diffuse transversally, which is helpful for the gas barrier material layer 108 to achieve an extremely high and uniform humidity.

Additionally, the practical test data of the present invention are shown in Table 1, including the test results of Comparative Examples 1-2 and Experimental Examples 1-7, wherein the Comparative Examples 1-2 are tests performed when the flat fuel cell assembly is not provided with the gas barrier material layer, and Experimental Examples 1-2, 3-4, 5-6 are tests performed when the flat fuel cell assembly is respectively provided with the gas barrier material layer of 100 μm, 200 μm, and 400 μm. Experimental Example 7 is a test performed for the flat fuel cell assembly provided with a gas barrier material layer with a thickness of 100 μm and a hydrophobic porous material layer with a thickness of 500 μm.

TABLE 1

| | Thickness of Gas Barrier Material Layer (μm) | Opening Ratio of Gas Barrier Material Layer | Concentration of Fuel (vol. %) | Actual Water Consumption of Anode/ Theoretical Water Consumption of Anode |
|---|---|---|---|---|
| Comparative Example 1 | no | 100% | 3 | 2.13 |
| Comparative Example 2 | no | 100% | 10 | 12.41 |
| Experimental Example 1 | 100 | 3% | 10 | −0.25 |
| Experimental Example 2 | 100 | 4% | 8.5 | −0.02 |
| Experimental Example 3 | 200 | 21% | 10 | −2.56 |
| Experimental Example 4 | 200 | 11% | 10 | −2.97 |
| Experimental Example 5 | 400 | 21% | 10 | −2.74 |
| Experimental Example 6 | 400 | 11% | 10 | −3.14 |
| Experimental Example 7 | 100 μm of gas barrier material layer + 500 μm of hydrophobic porous material layer | 5% | 10 | −6.28 |

As known from the test results of Comparative Examples 1-2, the flat fuel cell assembly without being provided with a gas barrier material layer cannot achieve the object of recycling the water. As known from the test results in Experimental Example 1, when the thickness of the gas barrier material layer is 100 μm, the opening ratio is 3%, and the actual water consumption of anode/theoretical water consumption of anode is −0.25, which indicates that the water recycled from the cathode is larger than that consumed at the anode, that is, the effect of recycling water from the cathode is achieved. Therefore, it is known that the flat fuel cell assembly of the present invention is indeed capable of recycling the water from the cathode catalyst layer for being reused.

Furthermore, as known from Experimental Examples 3 and 4, and Experimental Examples 5 and 6, under the circumstance that the thicknesses of the gas barrier material layer are the same, the smaller the opening ratio is, the more preferred the water recycling effect in the cathode is. In additionally, as known from the test results of Experimental Examples 3 and 5, Experimental Examples 4 and 6, the thicker the gas barrier material layer is, the more preferred the water recycling effect in the cathode is.

Furthermore, as known from the comparison between Experimental Examples 1 and 2 and Experimental Example 7, a hydrophobic porous material layer is further added on the inner side of the gas barrier material layer, which can further achieve a more preferred effect of recycling the water at the cathode.

As known from the test results of Table 1, the thickness of the gas barrier material layer, the opening ratio and the concentration of the fuel all influence the amount of the water that is recycled at the cathode. Generally, the thicker the gas barrier material layer is, the smaller the opening ratio is, the less the water is evaporated, and the higher the water concentration is at the cathode. The higher the fuel concentration is at the anode, it is more useful for generating a concentration gradient for the water to be diffused back to the anode. Therefore, as long as these conditions are matched appropriately, the flat fuel cell assembly of the present invention can achieve the object of recycling the water at the cathode catalyst layer back to the anode catalyst layer for being reused.

Figure 6:
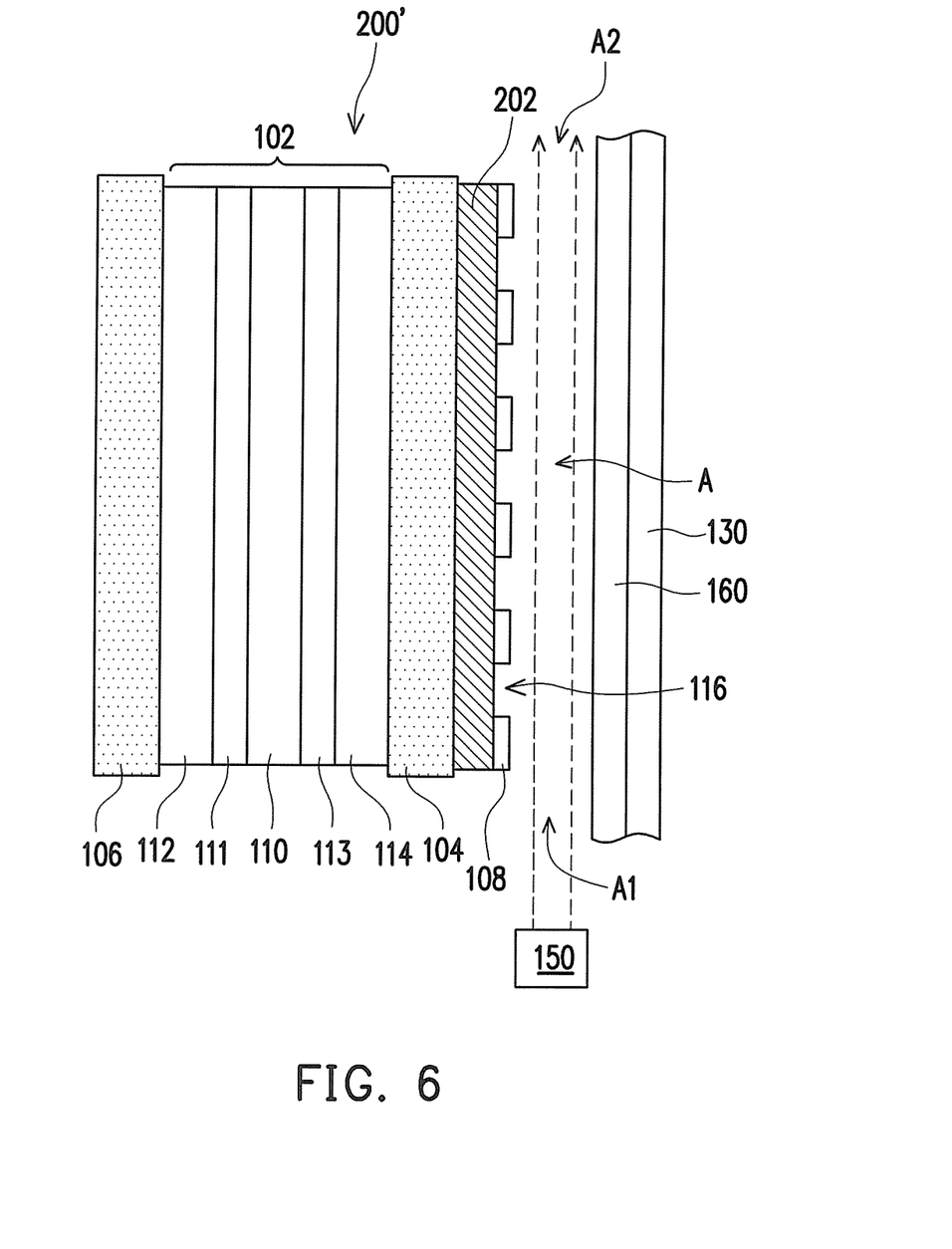
FIG. 6 is a schematic structural view of a flat fuel cell assembly according to one embodiment of the present invention.

FIG. 6 is a schematic structural view of a flat fuel cell assembly according to one embodiment of the present invention. Referring to FIG. 6, the flat fuel cell assembly 200' is similar with the above-mentioned flat fuel cell assembly 200 shown in FIG. 4 except that no air baffles are used in this embodiment. Specifically, the flat fuel cell assembly 200' includes a membrane electrode assembly (MEA) 102, a cathode porous current collector 104, an anode porous current collector 106, a gas barrier material layer 108, a case 130, a water absorbent material layer 160, and an air fan 150 for generating an air flow. The cathode porous current collector 104 and the anode porous current collector 106 are disposed at two opposite sides of the MEA 102. The gas barrier material layer 108 is disposed at a side of the cathode porous current collector 104 and has at least one opening 116. Specifically, the gas barrier material layer 108 is disposed on a surface of hydrophobic porous material layer 202 and a surface of the hydrophobic porous material layer 202 is exposed by the opening 116. The case 130 is disposed at a side of the MEA 102, the gas barrier material layer 108 is disposed between the case 130 and the MEA 102, and an air channel A is located between the gas barrier material layer 108 and the case 130. The water absorbent material layer 160 is disposed on the case 130, wherein the water absorbent material layer 160 is between the case 130 and the gas barrier material layer 108. The air flows from an air inlet A1 of the air channel A to an air outlet A2 of the air channel A.

Figure 7A:
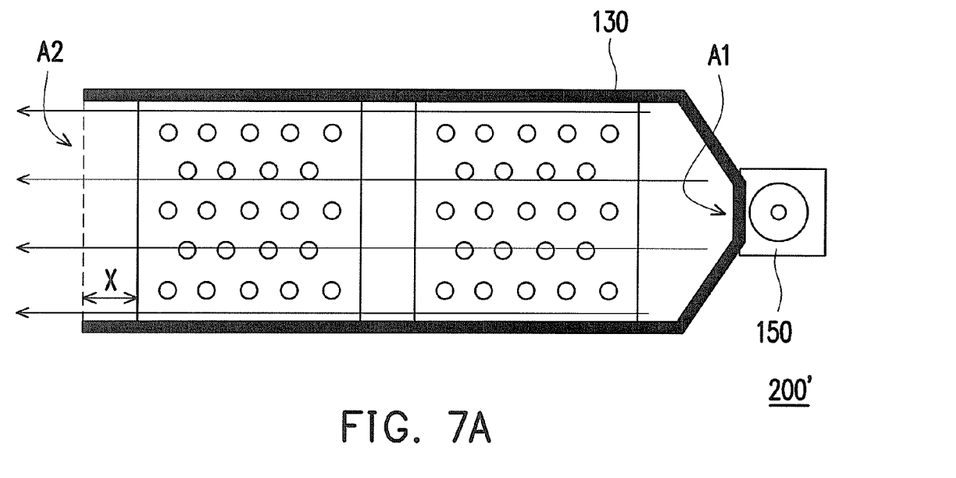
FIG. 7A and FIG. 7B are perspective views of a flat fuel cell assembly shown in FIG. 6.
Figure 7B:
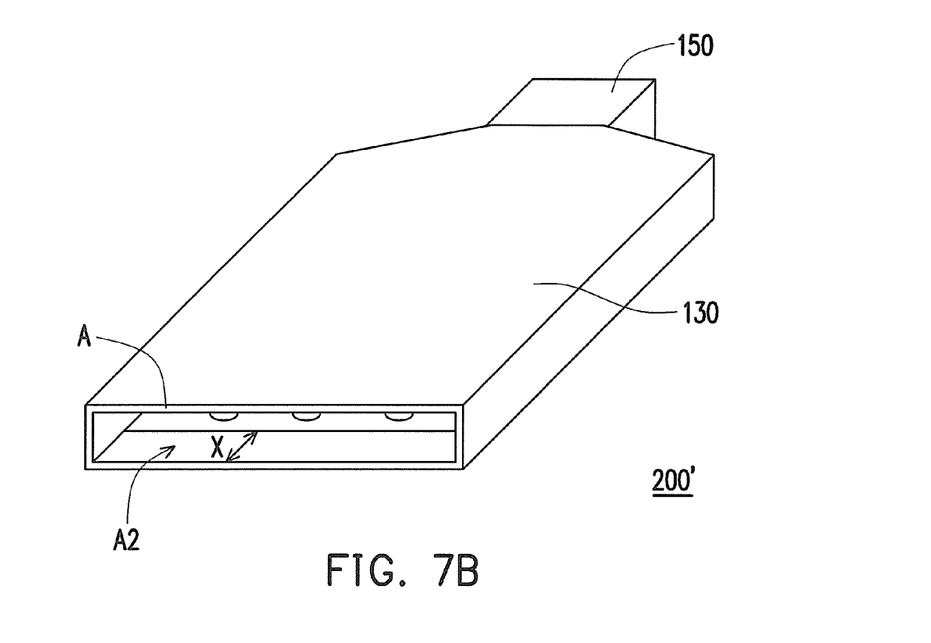

FIG. 7A and FIG. 7B are perspective views of a flat fuel cell assembly shown in FIG. 6. Referring to FIG. 7A and FIG. 7B, activation for the flat fuel cell assembly 200' is required since oxide is formed on the surface of the cathode catalyst layer 113 when the flat fuel cell assembly 200' operates for a long time. When oxide is generated on the surface of the cathode catalyst layer 113 the activity of the cathode catalyst layer 113 is reduced and the performance of the flat fuel cell assembly 200' deteriorates accordingly. In order to activate the flat fuel cell assembly 200', one ordinary skilled in the art needs to stop supplying air to the cathode such that the fuel can crossover the MEA 102 and reduction of cathode can be achieved. In this embodiment, the activation of the flat fuel cell assembly 200' may be performed merely by turning off the air fan 150 without blocking the air outlet A2. Under this condition, a distance x that is long enough is required.

When the air fan 150 is turned off, oxygen in the air channel A is consumed gradually. If the distance x is long enough, the amount of oxygen diffused from the air outlet A2 is insufficient and activation of the flat fuel cell assembly 200' may be performed successfully. The air permeability of the gas barrier material layer is estimated through the following diffusion equation (2):

$$J = -D \frac{\Delta c}{\Delta x} A, \qquad (2)$$

wherein, J indicates the amount of oxygen diffused into the air channel, with the unit as mole/s; D indicates the diffusion coefficient, with the unit of $cm^2/s$, and generally, the diffusion coefficient of $O_2$ in the air is about 0.2-0.3 $cm^2/s$; $\Delta c$ indicates the concentration difference, with the unit as $mole/cm^3$, and in the normal temperature environment of 1 atmospheric pressure, there are about $8.6 \times 10^{-6}$ mole of $O_2$ for 1 cubic centimeter; $\Delta x$ indicates the distance of the diffusion path, with the unit as centimeter; and A indicates the cross-sectional area of the air outlet.

Figure 8:
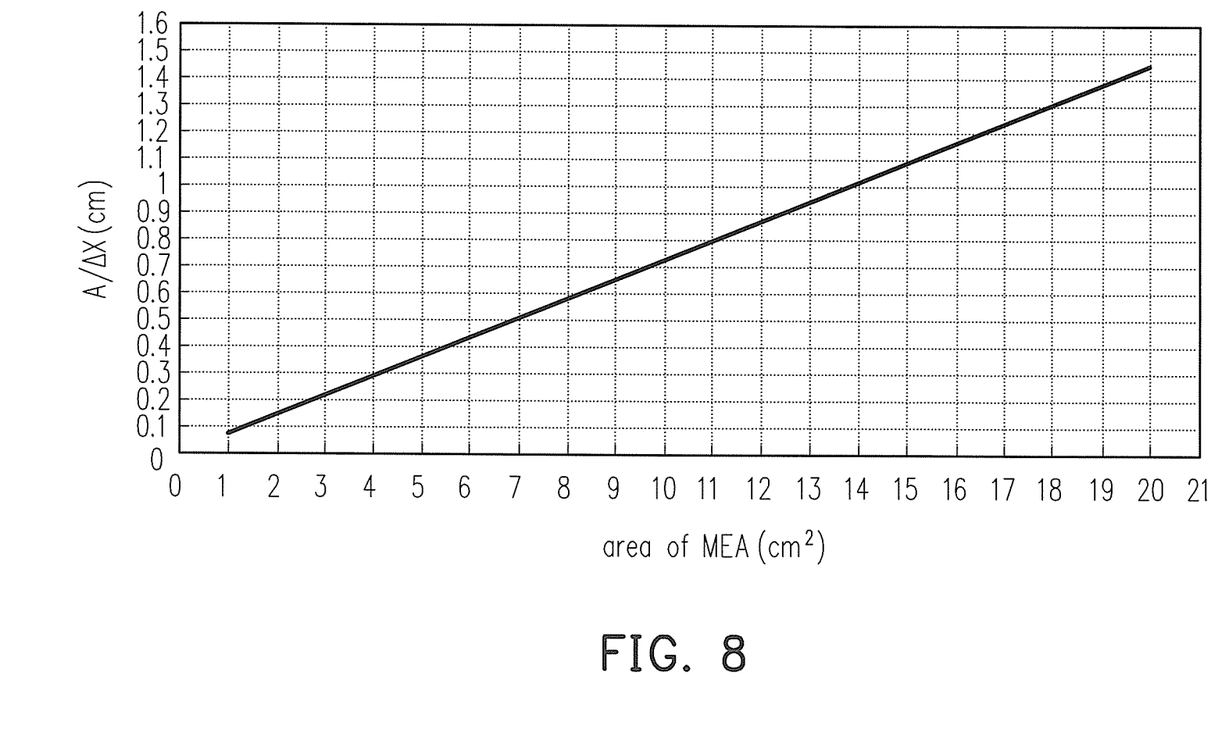
FIG. 8 is a diagram showing the relationship between area of MEA and A/Δx.

For example, when the flat fuel cell assembly 200' operates normally, the amount of the fuel crossover the MEA 102 is usually greater than 5 μmole/cm²/min and the amount of oxygen is required to be greater than 7.5 μmole/cm2/min. In this embodiment, $\Delta c$ is assumed to be $8.6 \times 10-6$ mole/cm³, the relationship between the area of MEA and A/$\Delta x$ is shown in FIG. 8. Specifically, the ratio of A/$\Delta x$ and the area of MEA illustrated in FIG. 8 is about 0.073 1/cm. It is noted that the air outlet may be of any shape and the quantity of the air outlet may be one or more.

Figure 9:
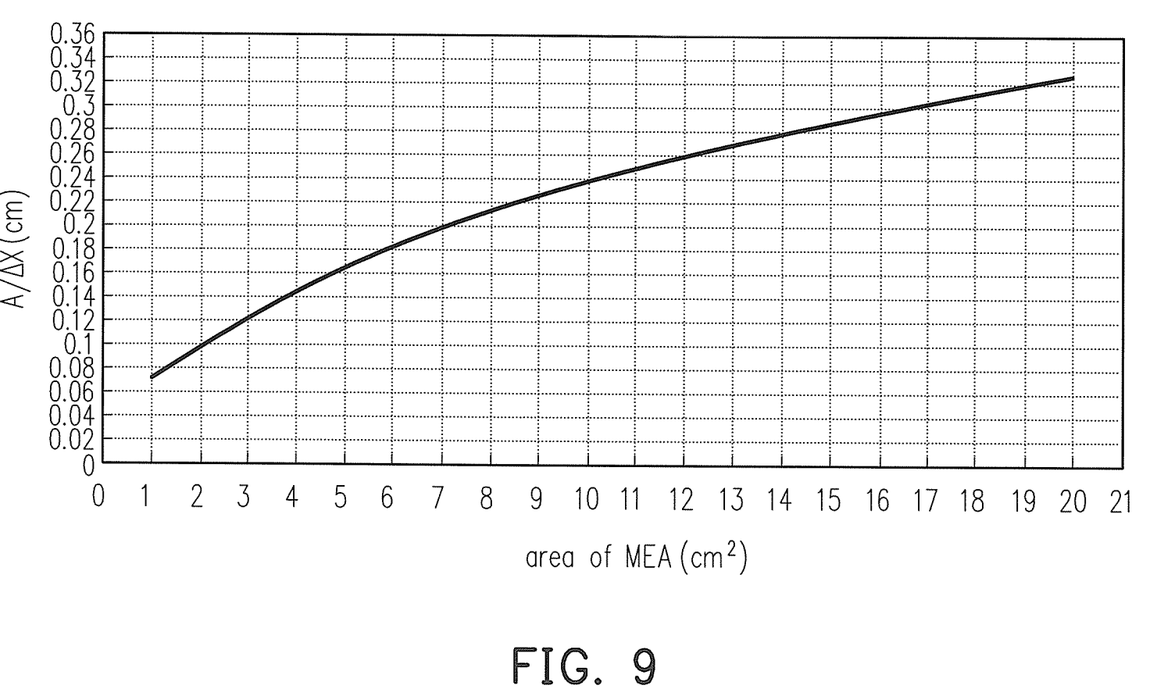
FIG. 9 is a diagram showing the relationship between area of MEA and d/Δx.

When the MEA 102 is a square MEA and the width of the air outlet A2 is substantially equal to the length of the square MEA 102, the relationship between the area of MEA and d/$\Delta x$ is obtained and shown in FIG. 9.

To sum up, the present invention at least has the following advantages.

1. The manufacturing method of the present invention is relatively simple and the elements required in the whole fuel cell are fewer, thereby saving the manufacturing cost.

2. The present invention can recycle the water in the cathode catalyst layer simply and effectively without changing the inner structure of the existing MEA.

3. The present invention uses a high-concentration fuel for the reaction, thereby enhancing the energy conversion efficiency of the fuel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flat fuel cell assembly, comprising:
a membrane electrode assembly (MEA);
a cathode porous current collector;
an anode porous current collector, the cathode porous current collector and the anode porous current collector being disposed at two opposite sides of the MEA;
a gas barrier material layer disposed at a side of the cathode porous current collector and having at least one opening for exposing a surface of the cathode porous current collector;
a case disposed at a side of the MEA, the gas barrier material layer being disposed between the case and the MEA, and an air channel being located between the gas barrier material layer and the case;
a water absorbent material layer disposed on the case, wherein the water absorbent material layer is between the case and the gas barrier material layer and is spaced apart from the gas barrier material layer to form the air channel; and
an air fan for generating an air flow, wherein the air flows from an air inlet of the air channel to an air outlet of the air channel, wherein the air outlet of the air channel is not blocked when the air fan is turned off and the ratio of A/$\Delta x$ is less than or equal to 0.073 cm per cm² area of MEA while Δx indicates a distance from the air outlet to the MEA, with the unit as centimeter; and A indicates a cross-sectional area of the air outlet.

2. The flat fuel cell assembly as claimed in claim 1, wherein the MEA comprises a proton conducting membrane, an anode catalyst layer, a cathode catalyst layer, an anode gas diffusion layer (GDL) and a cathode GDL, wherein the anode catalyst layer and the cathode catalyst layer are respectively disposed on two sides of the proton conducting membrane, and the anode GDL and the cathode GDL are respectively disposed on the anode catalyst layer and the cathode catalyst layer.

3. The flat fuel cell assembly as claimed in claim 1, wherein a diameter of the opening is DI, a thickness of the gas barrier material layer is T, and D>2T.

4. The flat fuel cell assembly as claimed in claim 1, wherein the case is a gas-impermeable case.

5. The flat fuel cell assembly as claimed in claim 1, further comprising at least one air baffle disposed within the air channel.

6. The flat fuel cell assembly as claimed in claim 5, wherein the air baffle is disposed on the gas barrier material layer and extends toward the case.

7. The flat fuel cell assembly as claimed in claim 5, wherein the air baffle is disposed on the case and extends toward the gas barrier material layer.

8. The flat fuel cell assembly as claimed in claim 1, wherein the opening ratio of the gas barrier material layer falls within 0.5%-21%.

9. The flat fuel cell assembly as claimed in claim 1, wherein a material of the gas barrier material layer comprises a polyester polymer or a polyolefin polymer.

10. The flat fuel cell assembly as claimed in claim 9, wherein the polyester polymer comprises polyethylene terephthalate (PET) or polyacrylonitrile (PAN).

11. The flat fuel cell assembly as claimed in claim 9, wherein the polyolefin polymer comprises polyethylene (PE) or polypropylene (PP).

12. The flat fuel cell assembly as claimed in claim 1, wherein a thickness of the gas barrier material layer falls within 10 μm-5 mm.

13. The flat fuel cell assembly as claimed in claim 1, wherein a gap is between the gas barrier material layer and the cathode porous current collector.

14. The flat fuel cell assembly as claimed in claim 13, wherein the gap is smaller than 1.5 cm.

15. The flat fuel cell assembly as claimed in claim 1, wherein the gas barrier material layer is in contact with the cathode porous current collector.

16. The flat fuel cell assembly as claimed in claim 1, further comprising a hydrophobic porous material layer disposed between the cathode porous current collector and the gas barrier material layer.

17. The flat fuel cell assembly as claimed in claim 16, wherein the hydrophobic porous material layer entirely covers the cathode porous current collector.

18. The flat fuel cell assembly as claimed in claim 16, wherein the hydrophobic porous material layer is located on the cathode porous current collector and is exposed by the opening of the gas barrier material layer.

19. The flat fuel cell assembly as claimed in claim 16, wherein the hydrophobic porous material layer is made of polytetrafluoroethylene (PTFE), polypropylenen (PP), or polyethersulfone (PES).

* * * * *